(12) United States Patent
Riley (10) Patent No.: US 7,815,435 B2
(45) Date of Patent: Oct. 19, 2010

(54) HOME DECORATING SYSTEM

(76) Inventor: Paula Riley, 315 W. 57th St., Suite 21C, New York, NY (US) 10019

( * ) Notice: Subject to any disclaimer, the term of this patent is extended or adjusted under 35 U.S.C. 154(b) by 839 days.

(21) Appl. No.: 11/559,137

(22) Filed: Nov. 13, 2006

(65) Prior Publication Data

US 2007/0111178 A1    May 17, 2007

Related U.S. Application Data

(60) Provisional application No. 60/736,728, filed on Nov. 15, 2005.

(51) Int. Cl.
*G09B 25/00* (2006.01)
(52) U.S. Cl. ...................... 434/72
(58) Field of Classification Search .................. 434/72, 434/75, 79, 80, 96, 98; 382/111
See application file for complete search history.

(56) References Cited

U.S. PATENT DOCUMENTS

| | | | | |
|---|---|---|---|---|
| 4,791,743 A * | 12/1988 | Kleinke | ...................... | 40/322 |
| 4,931,929 A * | 6/1990 | Sherman | ...................... | 705/500 |
| 5,252,071 A * | 10/1993 | Hansard | ...................... | 434/75 |
| 5,368,485 A * | 11/1994 | Phillips | ...................... | 434/75 |
| 5,368,486 A * | 11/1994 | Kurzman | ...................... | 434/79 |
| 5,601,431 A * | 2/1997 | Howard | ...................... | 434/79 |
| 5,688,125 A * | 11/1997 | Birdsong-Raffo | ............ | 434/72 |
| 5,743,407 A * | 4/1998 | Williams | ...................... | 206/575 |
| 6,122,391 A * | 9/2000 | Ringland et al. | ............ | 382/100 |
| 6,572,377 B2 * | 6/2003 | Masters | ...................... | 434/72 |
| 6,925,196 B2 * | 8/2005 | Kass et al. | ................... | 382/111 |
| 6,928,454 B2 * | 8/2005 | Menner et al. | ........... | 707/104.1 |
| 7,062,722 B1 * | 6/2006 | Carlin et al. | ................. | 715/850 |
| 7,230,629 B2 * | 6/2007 | Reynolds et al. | ............ | 345/589 |
| 7,330,585 B2 * | 2/2008 | Rice et al. | ................... | 382/162 |

* cited by examiner

*Primary Examiner*—Kurt Fernstrom
(74) *Attorney, Agent, or Firm*—Notaro, Michalos & Zaccaria P.C.

(57) ABSTRACT

A method and system for decorating includes product categories such as rugs, pillows, lamps, paints, window treatments, wall coverings such as wall papers and trims, artificial flowers, fabric furniture covers and other decorative items. Multiple motif collections are provided, each characterized by a subset of colors or other characteristics that are selected from a master set of colors or characteristics, and at least one other decorative driver such as fabric, pattern, texture or style. Each product is identified with one or more of the collections based on the product color and/or the presents of the other decorative driver. A separate key code mechanism, such as a hang tag and/or a product label or packaging for each motif collection, has an identifier for the subset of colors and the at least one decorative driver for that collection. The key code helps a consumer select those products in each category of interest, that fall within a desired collection.

4 Claims, 7 Drawing Sheets

HANG TAG FOR WINTER BRIGHTS COLLECTION

FIG. 1 various products of the various product categories are shown and include fabrics, patterns and style (the other decorative drivers) and the permitted colors

HOME DECORATING SYSTEM

CROSS REFERENCE TO RELATED APPLICATION

This application claims priority on U.S. provisional patent application 60/736,728 filed Nov. 15, 2005, which is incorporated here by reference.

FIELD AND BACKGROUND OF THE INVENTION

The present invention relates in general to the field of interior decorating, and in particular, to a new and useful system for decorating a home or office.

GARANIMALS is a trademark owned by Garan Services Corp., for a line of mix and match children's clothing. For the philosophy behind the GARANIMALS line of children's clothing, see:

http://www.garanimals.com/meet the garanimals.htm#.

The present invention uses a mix and match philosophy, but in the art of interior decorating, and expands upon it.

The consumer that buys a $20,000 to $30,000 car every 2 to 3 years, may buy a $1000 sofa every 10 years. According to the present invention, a customer or client need not wait until there is a need for a piece of furniture, but rather, the invention provides a mechanism for the customer to be ready for a change or update long before she is ready to replace the furniture.

Furniture customers rarely browse furniture as they do fashion clothing. According to a FurnitureStyle/Vance survey taken in 2004, 41% of furniture customers bought at the first store they entered. Due to certain aspects of the present, a customer is, to her benefit, invited to see the latest home fashion looks.

Retail sales for Halloween rival those for Christmas. According to the present invention, holiday home decorating and accent purchases are facilitated.

The online component of the invention is meant to advance the system beyond a regional, to a national presence.

TV decorating shows promise viewers change. "Extreme Makeover", "Trading Spaces", "While You Were Out" and over 100 more shows tell people that they want change that is quick, fun and dramatic. The present invention gives the home decorating consumer the look of a professional designer with the ease and individuality of a personal shopper.

SUMMARY OF THE INVENTION

The merchandising concept of the present invention recognizes that the same need and impulse that induces (for some men), and requires (for most women), a person to wear the latest fashion, will compel her to wardrobe or dress her home as well. The present invention provides a system to make this periodic redecorating, practical. The fashion that she follows in magazines, that she covets on celebrities, that she sees in her closet, that she wears every day, will surround her in her home and she will be able to live in the ever-changing and evolving world of fashion, in her home. By integrating the well-accepted slipcover trend, the present invention creates a revolutionary home decorating vehicle. Since 75% of men have some degree of color sensitivity deprivation (e.g. color blindness), the present invention can be of particular benefit to a large segment of the population. In particular, the customer is relieved of the fear of not knowing if colors match or can be mixed from one season to the next.

The impediments to decorating with confidence are overcome by applying women's fashion merchandising and retailing to the home decorating environment.

Currently, each segment of the home furnishings/accessories industry, merchandise and market separately from one another. Paint companies can only suggest a new palette of non-traditional colors. Rug sellers can offer a new rug. Slipcover makers can try to replace the appearance of an existing piece of furniture. All work independently of one another. The biggest drawback for all exiting home furnishings/decorating companies is that the items must fit into the customer's established environment. Another feature of the invention is that this environment can be controlled to the customers benefit. This is partly achieved by the invention by setting the colors and servicing (periodically updating) the palette.

Fixed base colors that are maintained from one season the next, guaranteed to match from year to year, in the same way that Liz Claiborne built the separates business to create the bones of the wardrobe. The navy is the navy. The burgundy is the burgundy. The colors repeated in new combinations with changing fashion color accents and patterns. The invention grows her home wardrobe just as she builds her own fashion statement.

Color continuity will travel from season to season, style to style to promote ongoing sales. Just as a woman develops the vocabulary of her clothing, the color schemes will also be seen in different tastes so that the home decorator will have the confidence to shift from sleek and modern to softer or traditional styling as the home wardrobe is built. The customer will be groomed to trust the accomplished design staff of the business method of the present invention, and let go of the "fear of decorating" that limits the imagination and confidence of the non-professional. The trademark House Dressing™ or Home Dressing™ is contemplated for use with the business method of the present invention, although additional or different marks may be used.

Well-fitting slipcovers that maintain their line in the set solids form the base of the merchandise. Delicious seasonal accent fabrics, accessories, and embellishments drive the sale. Fabulous fashion covers and colors that she might not want to live with as upholstered pieces will be terrific for a seasonal change.

Pillows and fashion patterns will be the "hook" that drives her from one season to the next. Coordinated pillows and/or pillow tops will be pushed to her as a way to transition into new looks and increase their involvement with the invention. The inexpensive pillow tops will keep the customer dedicated to the ensemble system. New accessory palettes and "Decorative Drivers" will be pushed to her via email contact.

A renewable lamp design covers this important accessory category.

Affordable area rugs will add the vital accessory of floor coverings for masking the challenge from existing carpeting or laid over hardwood floors. A selection of simple window treatments will be available.

Just as a woman has her seasonal makeup colors, perfect paint palette choices will be provided for the finishing touch.

The marketing concept—The House Dressing™ or Home Dressing™ customer is not concerned with issue of the furniture comfort. Her commitment to her furniture is established. The invention is fashion decorating. The sale is made through her fashion impulse. The invention sells fashion for the home. She is committed to her furniture investment but she gets to fall in love with new looks every day of the week.

The method of the present invention amplifies the furniture industry by selling the furniture customer an additional seasonal fashion look and thereby monetizing and capitalizing on the nine fallow years between the usual furniture purchases. She can buy the furniture that she is comfortable living with AND buy a fashion ensemble that thrills her for now. Accessories like pillows, lamps and rugs add colorful seasonal elements to the in-store floor display.

The home decorating client is assured of the perfect match, mix and mingle fashion ensemble. Within the "Decorative Driver" story she is given choices that SHE makes, giving her room her own individual imprimatur. She will know that she is purchasing outfits for her living room that will be able to go from season to season with new additions guaranteed to use the same basic colors.

The "Garanimal" for the present invention is a color code system. The ten or eleven basic colors appear on all hangtags and in store and online display. The specific colors that go with the "Decorative Driver" are called out. The code key for each item can be applied to future purchases. The client will be able to build her wardrobe of exciting and different styles around the basic color choices that she makes.

The sale according to the method of the present invention happens most easily in the computer and online environments. Pottery Barn sells hundreds of thousands of loose-fit slipcovers online or by catalog ONLY. Not one slipcover is in a store. The better customer is acclimated to a digital and non-store experience.

House Dressing™ is selling fashion statements into an already established setting. Computers make it possible for the customer to see all her decorating combinations and possibilities on key furniture pieces the reflect her own.

There is no way to inventory the necessary SKU's in individual stores. One of the biggest problems for slipcover retailers has been broken SKU'. It is almost impossible for the home decorator to buy all the sizes in the same look. The business method of the invention sells the complete look either in brick and mortar or kiosk locations, or online. The ensemble arrives in storable packaging, marked, and labeled with the key code shipped from central distribution center(s). This will reinforce to the client that she is building a wardrobe that goes on and comes off and efficiently stored in between look changes.

It is a further object of the present invention to provide a system and method that empowers the non-professional home decorating customer by providing seasonal, mistake-proof, coordinated decorating products and techniques. A decorating club membership component of the invention will establish real time and online communication and interaction with the customer or client, thereby creating a loyalty bond and a marketing vehicle.

Accordingly the invention is a method and system for decorating includes product categories such as rugs, pillows, lamps, paints, window treatments, artificial flowers, fabric furniture covers and other decorative items. Multiple motif collections are provided, each characterized by a subset of colors that are selected from a master set of colors, and at least one other decorative driver such as fabric, pattern, texture or style. Each product is identified with one or more of the collections based on the product color and/or the presents of the other decorative driver. A separate key code mechanism, such as a hang tag and/or a product label or packaging for each motif collection, has an identifier for the subset of colors and the at least one decorative driver for that collection. The key code helps a consumer select those products in each category of interest, that fall within a desired collection.

A still further object of the invention is to provide a system or method for assisting in the decoration of a habitable space, e.g. a room of a home, an office, an old age home apartment, a hotel suite, a hospital room, etc., comprising: a plurality of product categories, e.g. pillows, lamps, lamp shades, window dressing, paints, wall coverings such as wall papers and trims, fabric furniture covers (e.g. slipcovers), glassware (e.g. china, plates, cups, vases, dishes, bowls, glasses, dinner ware), table linen (e.g. table cloths, place mats, napkins), bed linen (e.g. blanket, throws, comforter, duvet, dust ruffle, skirts, pillow covers), artificial flowers and flower arrangements, rugs); each product category containing a plurality of different products; a plurality of motif collections, each collection being characterized by a subset of colors that are selected from a master set of plural colors, and at least one other decorative driver (e.g. fabric, pattern, texture, style); each product of each product category being identified with at least one collection based on the product including at least one of the subset of colors and the other decorative driver for that collection; and separate key code means (e.g. hang tag and/or product label or packaging) for each motif collection, each key code means including an identifier for the subset of colors and the at least one decorative driver for the respective collection, the key code means being used to help a consumer select from only those products in each product category of interest, that fall within a motif collection to be selected by the consumer.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Referring now to the drawings, the present invention is a method and system that are used to help a consumer decorate and redecorate her home, office or other habitable space, with confidence, and to gather an assortment of products in various product categories for current use for decorating the space with professionally matched colors and style, and to add and mix such products on an informed basis, for future redecorating.

Type of Business:

The trademark House Dressing™ or Home Dressing™ is used there to identify the business method of the present invention, understanding that different marks may be used for practicing the invention. The business method of the invention utilizes a home furnishings manufacturer and retailer that propels the razor-only furniture business into a dynamic razorblade decorating system. House Dressing™ empowers the non-professional home decorating customer by providing seasonal, mistake-proof, coordinated decorating products for the home. It is a radically new retailing, merchandising, and marketing concept. House Dressing™ establishes and nurtures a dynamic home decorating culture.

A decorating club membership component establishes real time and online communication and interaction with the client creates a powerful loyalty bond. House Dressing™ is a lifestyle brand.

The Opportunity:

As noted above, consumers buy far more expensive cars, more often than that buy furniture. Furniture does not have to wait for her to need furniture. A potential furniture customer may be ready for a change or update long before she is ready to replace the furniture. House Dressing™ grabs that customer bringing traffic and profit to those years between furniture purchases. $1000 sofa every 10 years turns into a $1000 every year for seasonal changes at House Dressing™. She invests then she dresses her furniture.

The House Dressing™ approach of the present invention gets traffic into a furniture store to see the latest fashion looks. For the existing furniture or online store customer, she is now a lifestyle client. She is an active participant in the House Dressing™ culture. Every six to eight weeks entirely new fashion statements appear to update her home wardrobe. When she is ready to buy the furniture she will be an established, loyal customer.

TV decorating shows promise viewers change and the House Dressing™ method of the present invention gives the home decorating consumer the look of a professional designer with the ease and individuality of a personal shopper.

The number of shelter magazines has tripled in the last 15 years. New entrant Domino parallels fashion dressing to home decorating. Palettes and must-haves are deliciously shown but the home decorating client still has to rely upon herself to pull it all together. The House Dressing™ method replaces the professional decorator and the personal shopper.

Furniture as selected and renewed according to the invention can capture the holiday shopper. Holiday decorating and accent purchases will bring traffic and revenue to retail environments that are not considered to be holiday shopping destinations, since a full Christmas or other holiday store of pillows, throws, rugs, accents, even stocking stuffers and specialized decorations are made available.

The House Dressing™ method is a lifestyle brand that engages, services and retains its customers through fashion ensemble merchandising. The online retail component advances beyond its regional presence to a national brand.

The Merchandising:

The same need and impulse that requires a person to wear the latest fashion will compel her to wardrobe or dress her houses. The fashion that she follows in magazines, that she covets on celebrities, that she sees in her closet, that she wears every day, will surround her in her home. She will live in the ever-changing evolving world of fashion in her home. The invention creates a seasonal home wardrobe ensembles.

Each segment of the home furnishings/accessories merchandise and market separately from one another. Paint companies can only suggest a new palette of non-traditional colors. Rug sellers can offer a new rug. Slipcover makers can try to replace the appearance of an existing piece of furniture. All work independently of one another, with no unifying concept or initiative. The biggest drawback for all exiting home furnishings/decorating companies is that the items must fit into the customer's established environment. The method of the invention is used to control the environment. The House Dressing™ method sets the colors and service the palette. Up-to-the-minute fashion engineered but yet individual, unique to the client.

The impediments to decorating with confidence are overcome by applying women's fashion merchandising and retailing principles to the home decorating environment.

Fixed base colors that are maintained from one season the next, guaranteed to match from year to year create the bones of the wardrobe in the same way that Liz Claiborne built the separates business. The navy is the navy. The burgundy is the burgundy. The colors repeated in new combinations with changing fashion color accents and patterns from season to season. The House Dressing™ customer grows her home wardrobe just as she builds her own fashion statement.

Color continuity will travel from season to season, style to style to promote ongoing sales. Just as a woman develops the vocabulary of her clothing, the color schemes will also be seen in different tastes so that the home decorator will have the confidence to shift from sleek and modern to softer or traditional styling as the home wardrobe is built. The customer will be groomed to trust the accomplished design staff of the House Dressing™ organization and let go of the "fear of decorating" that limits the imagination and confidence of the non-professional.

Slipcovers are to furniture what clothes are to people. The ability to change just one piece of furniture is the beginning of changing an entire room. Slipcovers have magical powers. They can dress up or dress down a chair or sofa. They can alter the appearance of furniture beyond its original form. Well-fitting slipcovers that maintain their line in the set solids form the base of the merchandise. Fabulous fashion covers and colors that she might not want to live with as upholstered pieces will be terrific for a seasonal change. Slipcovers make all changes possible and complete.

Delicious seasonal accent fabrics, accessories, and embellishments drive the sale. Pillows and fashion patterns will be the hook or "Decorative Driver" that urges her from one season to the next. Coordinated pillows and/or pillow tops transition into new looks and increase the client's involvement with House Dressing. The relatively inexpensive pillow tops will keep the customer dedicated to the ensemble system. New accessory palettes and "Decorative Drivers" will be pushed to her via email contact.

A renewable lamp design covers this important accessory category. Exciting and affordable area rugs will add the vital accessory of floor coverings for masking the challenge from existing carpeting or laid over hardwood floors. A selection of simple window treatments will be available. Just as a woman has her seasonal makeup colors, perfect paint palette choices will be provided for the finishing touch.

The Marketing:

The House Dressing™ business customer is not concerned with issues of furniture comfort. Her commitment to her furniture is established. The House Dressing™ approach is fashion decorating. The sale is made through her fashion impulse. The House Dressing™ business is selling fashion for the home.

The invention serves furniture stores by selling the furniture customer an additional seasonal fashion look. She can buy the furniture that she is comfortable living with AND buy a fashion ensemble that thrills her for now. Accessories like pillows, lamps and rugs add colorful seasonal elements to the in-store floor display.

The House Dressing™ client is assured of the perfect Match, Mix and Mingle™ technique for fashion ensemble. Within the "Decorative Driver" story she is given choices that SHE makes, giving her room her own individual imprimatur. She will know that she is purchasing outfits for her living room that will be able to go from season to season with new additions guaranteed to carry forward the same basic colors.

Figures 1, 2:
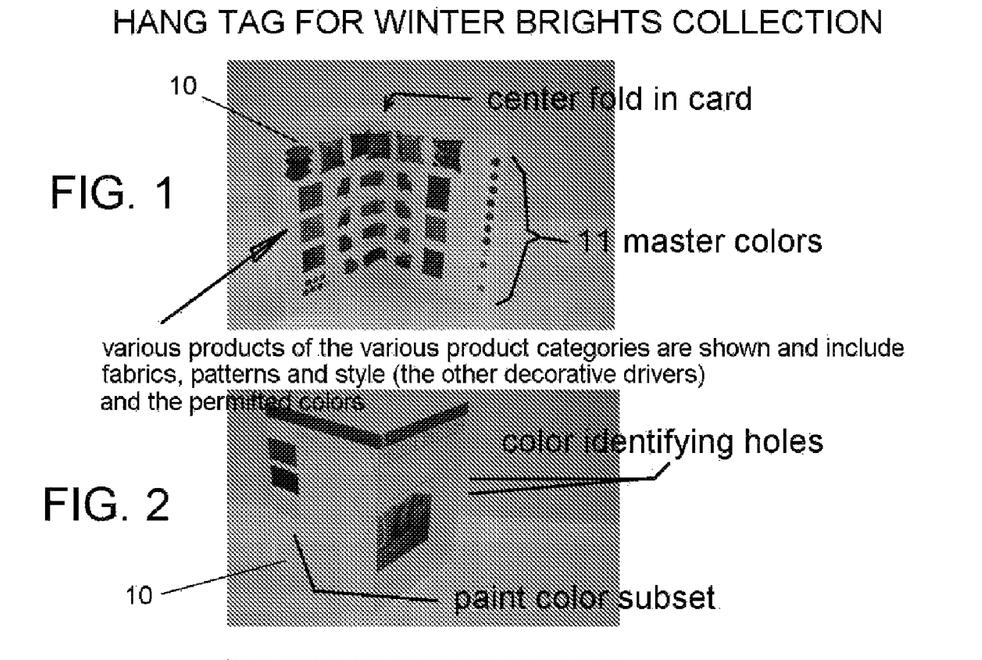
FIG. 1 is a perspective view of the inside of a color code booklet or key of the present invention.
FIG. 2 is a view similar to FIG. 1 of the outside front and back of the booklet or key.
Figure 3:
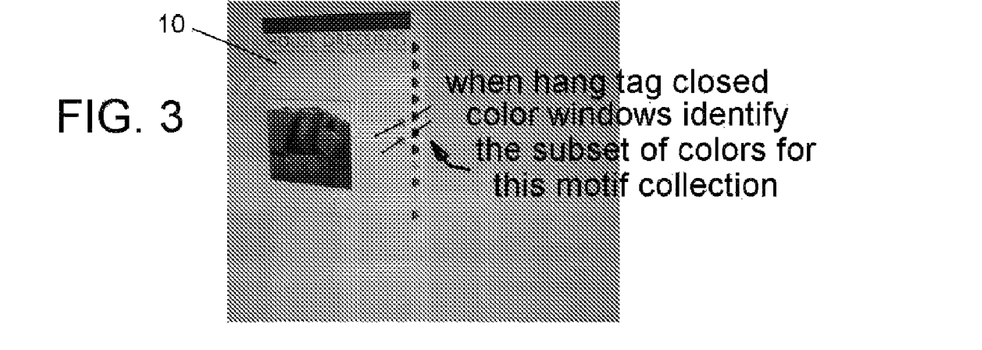
FIG. 3 is a view similar to FIG. 1 of the outside front of the booklet or key when closed.

The method of the present invention uses a color key code system illustrated in FIGS. 1, 2 and 3. Eleven basic colors, i.e. characteristics, appear on all hangtags, storage materials and containers and in store displays of the invention. The specific colors that go with the "Decorative Driver" are called out. The code key for each item can be applied to future purchases. The House Dressing™ client is able to build her wardrobe of exciting and different styles around the basic color choices that she makes.

The House Dressing™ invention is selling fashion statements into an already established setting. Intuitive, user-friendly software make it possible for the customer to see all her decorating combinations and possibilities on key furniture pieces the reflect her own.

The House Dressing™ sale happens most easily in the computer and online environments. The sale happens in-store but the visualization takes place online. Pottery Barn sells hundreds of thousands of loose-fit slipcovers online or by catalog ONLY. Not one slipcover is in a store. The better customer is acclimated to a digital and non-store experience.

The efficiency of the central distribution establishes the continuity of the specialized design experience. One of the biggest problems for slipcover retailers has been broken SKU's. It is almost impossible for the home decorator to buy all the sizes as an ensemble. House Dressing sells the complete look either in a brick and mortar/kiosk locations or online.

The ensemble created by practicing the invention arrives in storable packaging, marked and labeled with the color key code. This will reinforce to the client that she is building a wardrobe that goes on and comes off and efficiently stored in between look changes.

Every House Dressing™ component arrives in a permanent storage container: Labeled; Key coded and Ready to rotate.

A specifically designed storage closet is available, fitted to organize and accommodate her House Dressing™ ensembles.

"With consumers looking to unclutter their lives, storage has become a hot category once again. As a result, competition is picking up as retailers stake their claim to new and frequently high ticket segments of that business. The belief is that consumers will pay to get stuff out from under foot."—DSN Retailing Today, Feb. 28, 2005

Highly trained sales assistants will coach the culture. House Dressing will provide personalized take-away materials for her to have in her handbag for instant reference . . . a cheat sheet in a handy attractive pocket-wallet.

The System and Method:

Referring now again to FIG. 1, one embodiment of the key of the present invention is a bi-fold booklet 10 having two inside surfaces visible in FIG. 1, which carry graphic aids and text that will help the customer firmly visualize the product categories, provide examples of a plurality of different products in each category, and provide the full listing or graphic representation of all the characteristic, e.g. color, available for all the various motif collections, such as one for a season, i.e. Summer, Winter, Fall, Spring, a holiday, i.e. Halloween, Mother's Day, Hanukkah, or even a personal even, i.e. a birthday, graduation, or anniversary.

As will be explained later, the key includes a selector mechanism or key code means for identifying a subset of the characteristics that are suitable for the motif of the booklet being used. It is noted that all the characteristics (e.g. colors) for all of the motifs of the invention are included in every motif key since, as will be explained later, some specific products from different motifs can be used to decorate in another motif. The invention provides a way for the customer to use this cross-over with confidence by allowing two motif keys to be used together, e.g. to identify which colors (i.e. characteristics) are shared by both.

FIG. 2 shows the outside front and rear surfaces of the key of booklet 10 which has other graphic and textual aids of the invention. FIG. 3 shows the booklet 10 almost closed to illustrate how strategically positioned holes in the cover align with selected colors in the pallet inside the booklet as the key code means for each motif collection, each key code means including an identifier (the holes) for the subset of characteristics (the colors visible through the holes).

The customer can then select the correct product for each category of interest with confidence, for decorating the habitable space.

Figure 4:
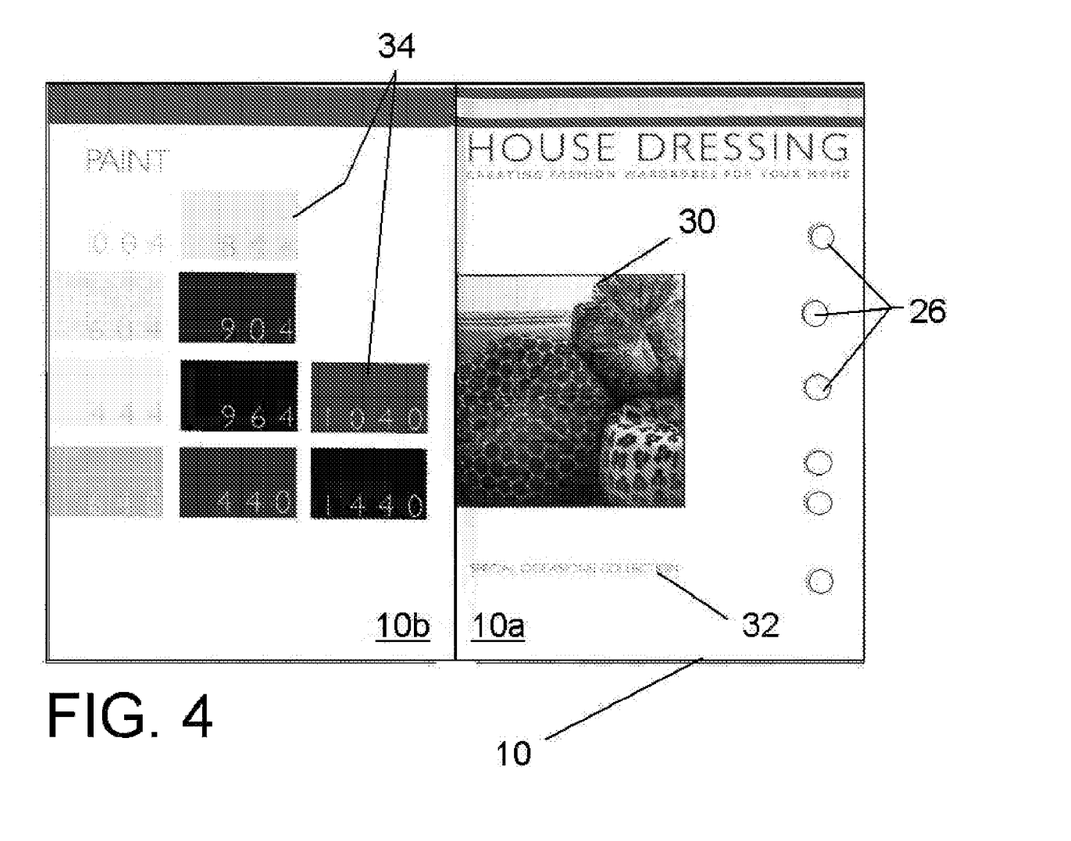
FIG. 4 is a plan view of an open key or booklet of the invention with the outside surfaces (the front and rear surfaces) visible and of one motif collection of the invention, i.e. Christmas.
Figure 5:
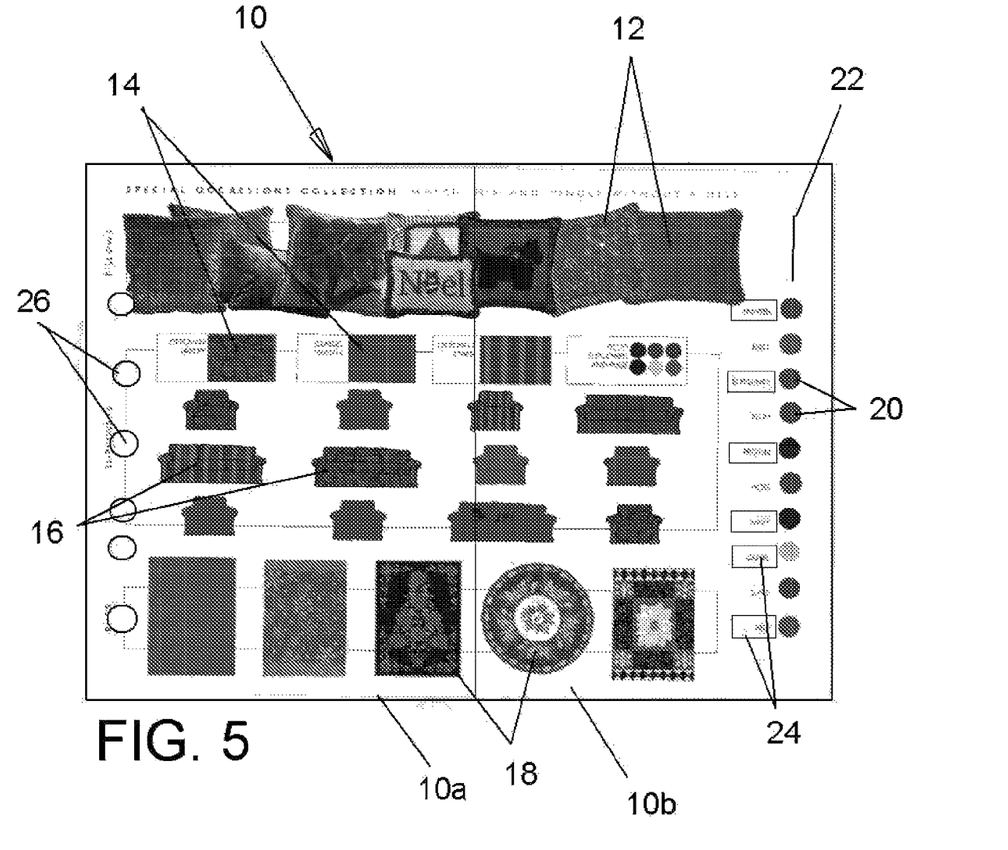
FIG. 5 is a plan view of the open key or booklet of FIG. 4, with the inside surfaces visible.
Figure 6:
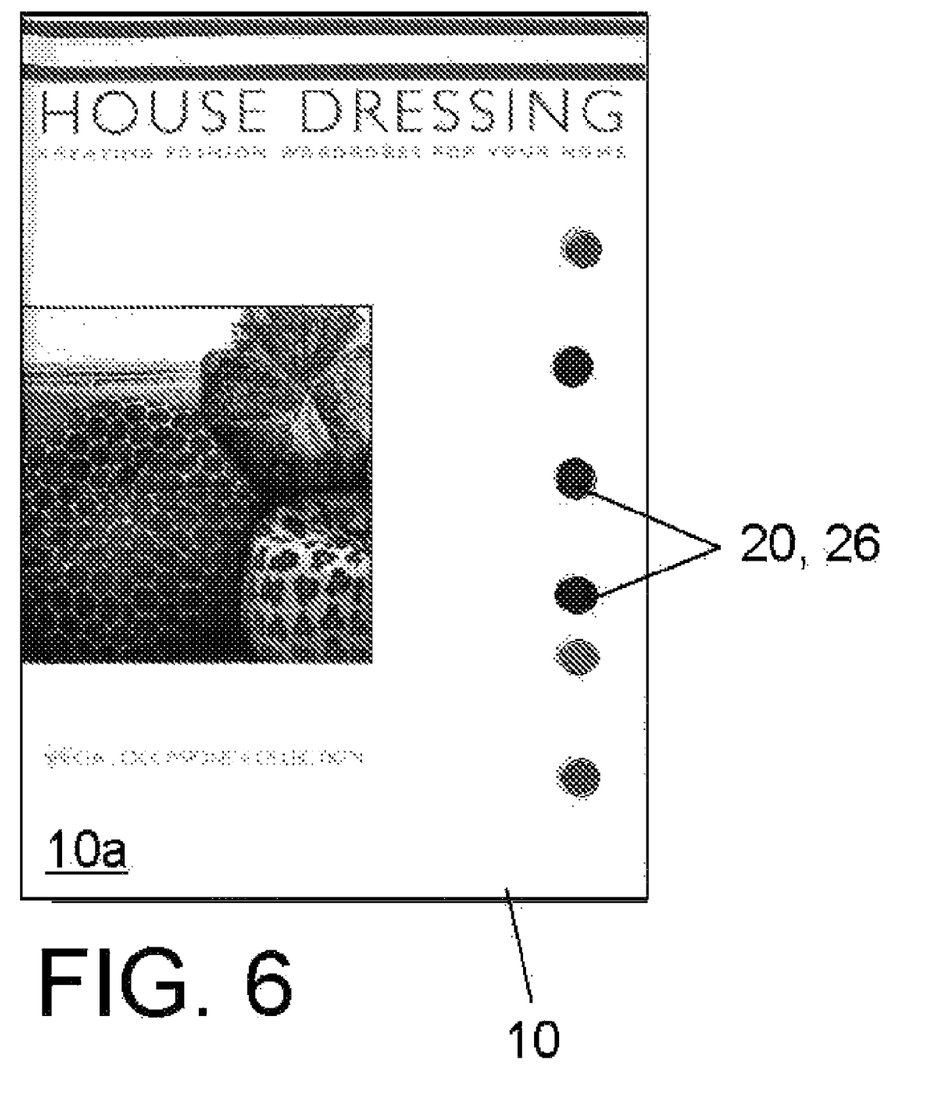
FIG. 6 is a plan view of the front surface of the closed key or booklet of FIG. 4, showing how selectors in the cover, e.g. holes, align with and therefore select a subset of characteristics, e.g. colors, from a larger color pallet inside the key, that correspond to the subset that may be used for the motif collection of the key.

Referring now to FIGS. 4, 5 and 6, a system for assisting in the decoration of a habitable space such as, but not limited to, a room of a home, an office, an old age home apartment, a hotel suite, a hospital room, etc., comprises a plurality of product categories such as, but not limited to pillows, lamps, lamp shades or other parts, window dressings or treatments, paints, fabric furniture covers (e.g. slipcovers), glassware (e.g. china, plates, cups, vases, dishes, bowls, glasses, dinnerware), table linen (e.g. table cloths, place mats, napkins), bed linen (e.g. blanket, throws, comforter, duvet, dust ruffle, skirts, pillow covers), artificial flowers and flower arrangements, rugs, which will each contain a plurality of different products. In FIG. 5 plural such products, e.g. pillows 12, are illustrated, as are plural categories, e.g. fabrics 14, furniture 16, and rugs or carpets 18. The color pallet or plurality of characteristics 20 is also shown in a vertical array 22, on the inside surface of the rear panel 10b of the key 10. The name of each color is listed next to each and the colors that are selectable for the motif in question, i.e. Christmas, has a box 24 around it, or is highlighted in some way so that the customer can identify the permitted colors without closing the booklet to use the selector means.

In FIG. 5 the selector holes 26 in the cover 10a on the left hand inside surface of the key are also visible, which, when the booklet is closed as in FIG. 6, will allow the selected colors, in this case six colors, be seen through the holes.

In this embodiment thus, of the 10 characteristics or designer colors of: Hunter, Brick, Burgundy, Plum, Brown, Moss, Navy, Camel, Slate, and Red, only Hunter, Burgundy, Brown, Navy, Camel, and Red can be used for the Christmas motif to select permitted individual products. The names of the colors and the number of colors can vary within the scope of the present invention and, in fact, the characteristics are not limited to colors but may be or may include other characteristics such as textures and even shapes for the multiple products in each product category.

Returning now to the example of color as the characteristic, this is the subset of characteristics or colors that are selected from the master set of, e.g. 10 colors, and at least one other decorative driver e.g. fabric, pattern, texture, style or the like.

Each product of each product category is identified with at least one collection based on the product including at least one of the subset of colors and the other decorative driver for that collection and the separate key code means (e.g. hang tag and/or product label or packaging) for each motif collection, each key code means includes an identifier for the subset of colors and the at least one decorative driver for the respective collection.

The key code means is used to help a consumer select from only those products in each product category of interest, that fall within a motif collection to be selected by the consumer.

As shown in FIG. 4, the cover 10a of the key has a general graphic 30 and label 32 for the motif and the rear surface has the permitted paint color pallet 34 for the motif.

Figure 7:
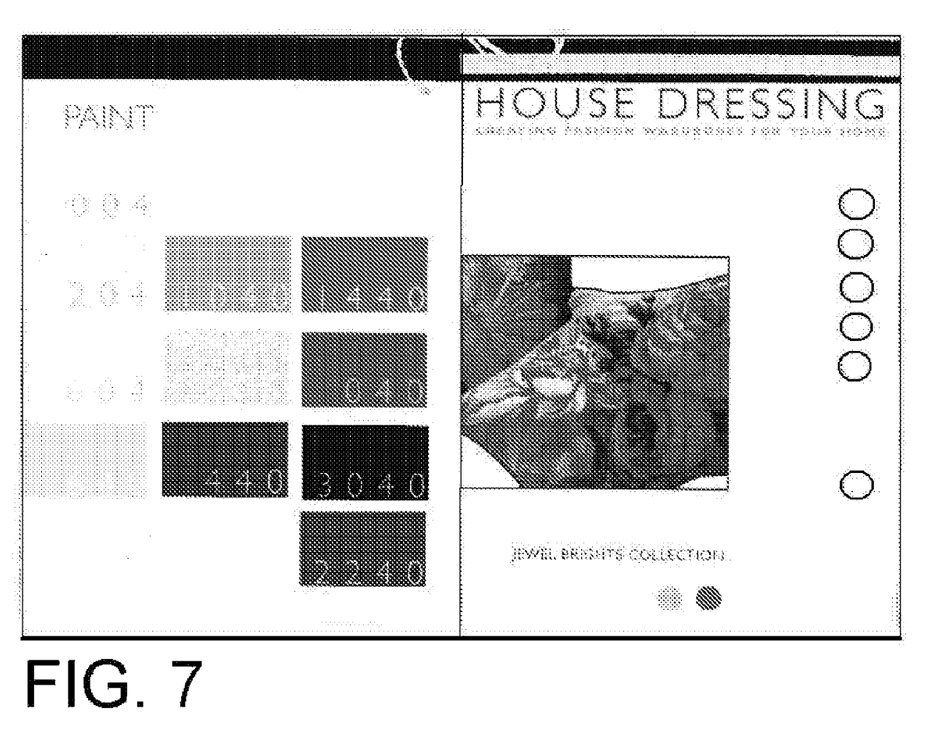
FIG. 7 is a plan view of an open key or booklet of the invention with the outside surfaces visible and of another one of the motif collections of the invention, i.e. Spring.
Figure 8:
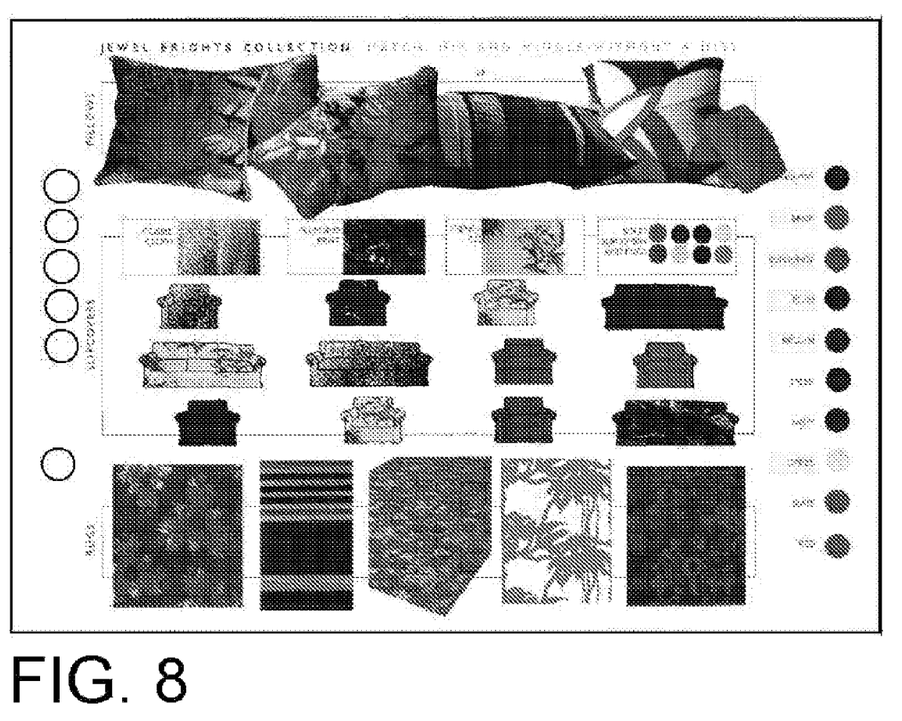
FIG. 8 is a plan view of the open key or booklet of FIG. 7, with the inside surfaces visible.

For comparison, FIGS. 7 and 8 show the respective outside and inside surfaces of the Spring motif key or booklet, which, to the extend the selector holes correspond to those of key 10 in FIG. 6, can be used to identify products that are already in the customers possession, e.g. by purchasing products for the Christmas motif, that can also be used to decorate with confidence using the Spring motif.

Figure 9:
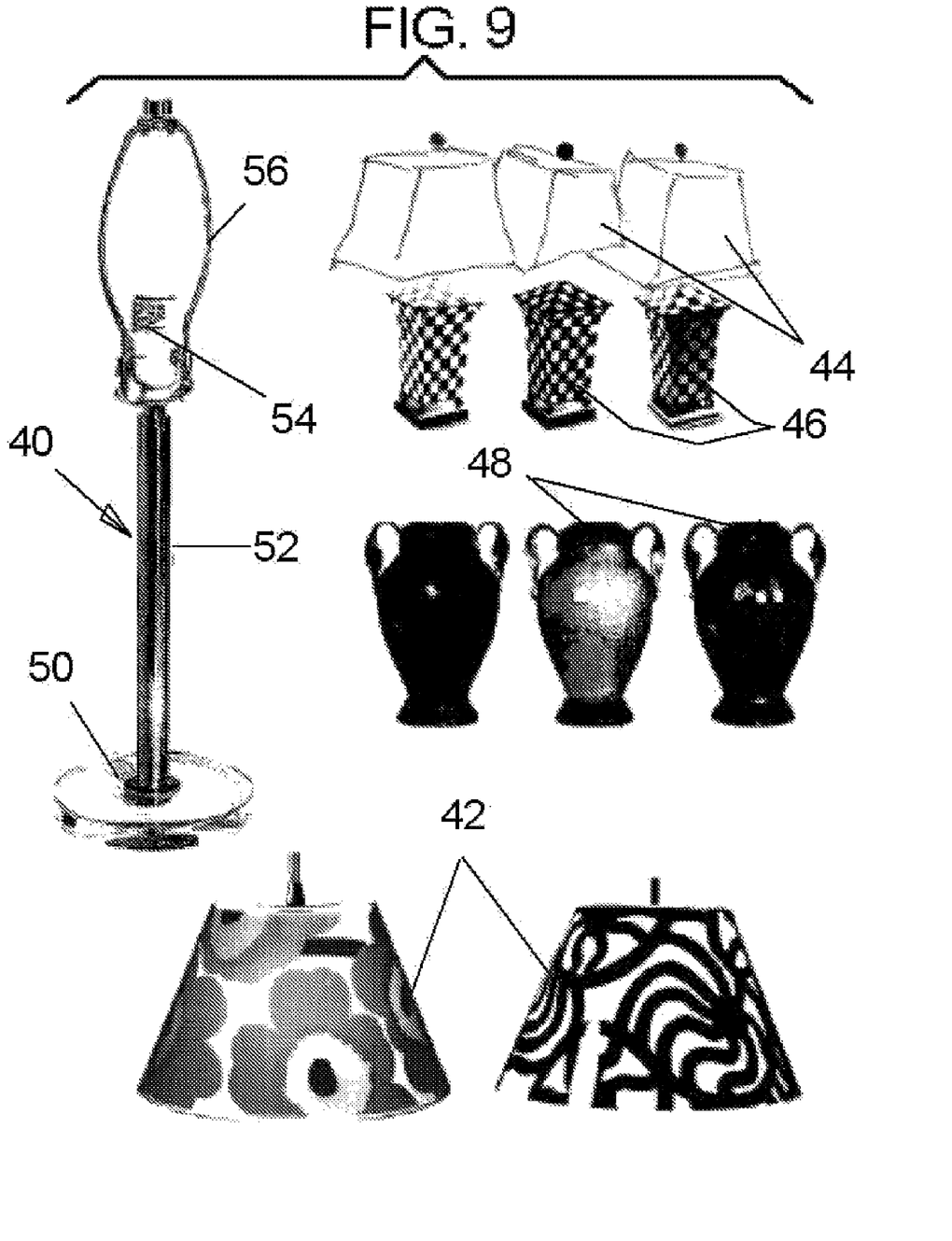
FIG. 9 is a view of an interchangeable lamp system according to another aspect of the invention.

FIG. 9 illustrates another product category and characteristics that can be selected for that product category, based on different motifs. In FIG. 9 the category is lighting or lamps, and the characteristics include shade shape at 42 and 44, shade color and surface pattern, body shape 46 and 48 and body color and surface pattern. To make the method and system of the invention even more versatile, the inventor has developed a generic lamp platform 40 having a base 50, a column 52 for receiving any of the bodies 46, 48, a socket 54 for a light bulb that is powers with conventional electrical fittings and wires, and a generic harp 56 designed to receive any of the shades 42, 44.

Selection of the subset of characteristic can be by using the key of FIGS. 1 through 8 with additional characteristics listed and alignable by holes in the cover or other means that can be as simple as a printed listing for each motif.

While specific embodiments of the invention have been shown and described in detail to illustrate the application of the principles of the invention, it will be understood that the invention may be embodied otherwise without departing from such principles.

What is claimed is:

1. A system for decorating a habitable space, comprising:
a plurality of product categories each containing a plurality of different products having at least one color from a master set of all colors, the product categories being selected from the group consisting of: rugs, pillows, lamps, lamp parts, paints, window treatments, wall coverings, artificial flowers, fabric furniture covers, glassware, table linen and bed linen;
a plurality of motif collections, each motif collection being characterized by a subset of colors that are selected from a master set of multiple colors, and at least one other decorative driver, the subset of different colors being less than the master set of multiple colors and the plurality of motif collections being selected from the group consisting of: a season motif, a holiday motif and a personal event motif;
each product of each product category being identified with at least one motif collection based on the product including at least one of the subset of colors and the other decorative driver for that motif collection; and
a key code for each motif collection, each key code including an identifier for identifying only the subset of colors from among the master set of multiple colors without having to visually identify any color of the subset of colors and the at least one decorative driver for the respective motif collection, the key code being used to identify only those products in each product category of interest that have a color from the subset of colors, that fall within a motif collection to be selected by the consumer;
the key code comprising a booklet for each motif collection, the booklet having an inside surface with graphic or textual aids that illustrate the product categories and examples of different products in each category and a full listing or graphic representation of all the colors available for all the motif collections, and a selector mechanism for identifying a subset of the colors that are suitable for the motif collection of the booklet being used, the booklet including on its inside surface, a pallet of all the colors of all the motif collections; and
the selector mechanism comprising the booklet having a cover with a plurality of the selector holes that, when the booklet is closed, align over selected colors of the pallet that can be seen through the holes and that correspond to the subset of colors.

2. The system of claim 1, including, in addition to said booklet, at least one of a hang tag, a product label, and a product packaging that is attached to each produce of each the product category so that each product can be identified as having at least one of the colors from the subset of colors.

3. The system of claim 1, including, in addition to said booklet, at least one of a hang tag, a product label, and a product packaging, and at least one key code also attached to each produce in each category to identify each product with the corresponding motif collection and wherein every produce of each product category can be identified as having at least one of the colors from the subset of colors.

4. The system of claim 1, wherein at least one of the decorative drivers is: fabric, pattern, texture and style.

* * * * *